3,437,281
TAPE REEL
André Quenot, Besancon, Doubs, France, assignor to Quenot & Cie S.a.r.l., Besancon, Doubs, France
Filed June 30, 1967, Ser. No. 650,444
Claims priority, application France, July 11, 1966, 68,986
Int. Cl. B65h 75/16
U.S. Cl. 242—84.8                                    6 Claims

ABSTRACT OF THE DISCLOSURE

In a portable linear measuring instrument, frictional brake means are provided to brake the rotational movement of the drum in order to avoid expansion of the tape wound thereon during rewinding or withdrawal of the tape. These means consist of spring blades which can be positioned along the inner sides of a half-casing, on the bevel of the lateral flanges of the winding drum or on its periphery.

---

The present invention is concerned with improvements in linear measuring instruments in order, on the one hand, to improve the juxtaposed position of the coils of the measuring tape wound on the drum, and, on the other hand, to effect, without any difficulty the perfect joining of the slots of the half casing and of the flange of the drum with a view to the insertion and the securing of the terminal end of the eventually disconnected tape.

To this effect, the improvements in linear measuring instruments are characterised in that means are provided in order to brake the rotational movement of the drum to avoid, during rewinding or unwinding of the measuring tape, that a slackening of the coils risking to cause these coils to leave their jointive position.

According to one characteristic of the invention, the friction means are light spring blades.

According to another characteristic of the invention, the spring blades are disposed along the inner sides of the half casing.

According to another characteristic of the invention, spring blades are mounted on the bevel of the lateral flanges of the winding drum.

According to another characteristic of the invention, the half casing is made of a transparent synthetic material.

The invention extends to the characteristics enumerated above and to their various possible combinations.

Figure 1:
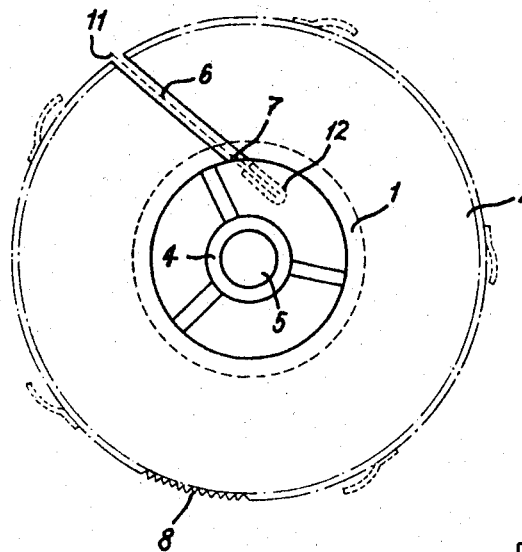
Figure 2:
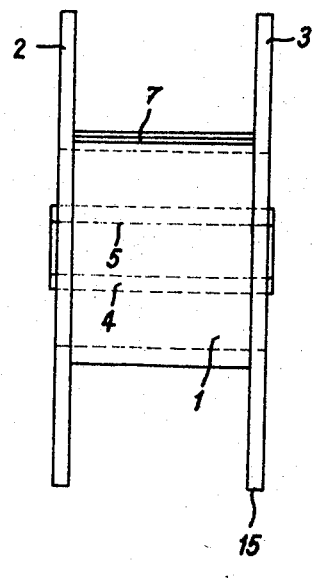
Figure 3:
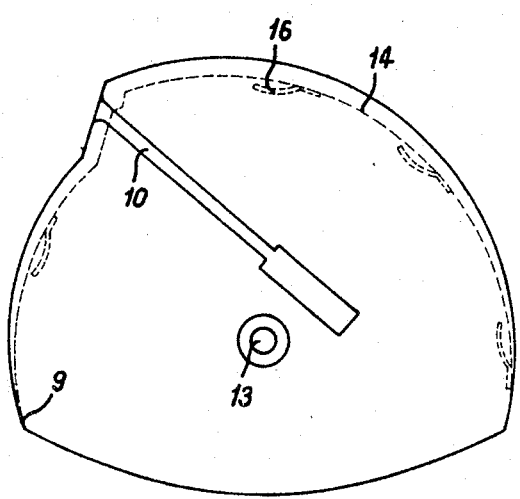
Figure 4:
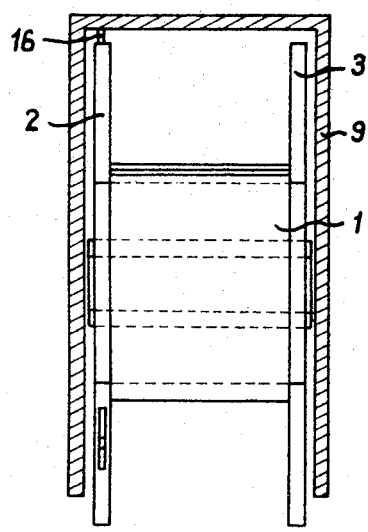
Figure 5:
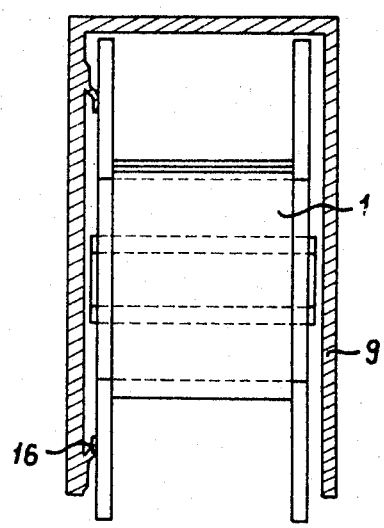
Figure 6:
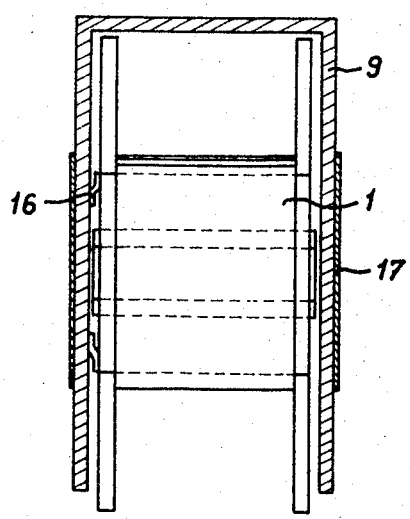

The invention will be better understood by reference to the following description made by way of non-limiting example and to the annexed drawing wherein:

FIGURE 1 shows a plan view of the winding drum;
FIGURE 2 shows a profile view of the winding drum;
FIGURE 3 is a plan view of the casing;
FIGURES 4, 5 and 6 are cross-sectional views showing the different locations of the spring brakes according to the invention.

As shown on FIGURE 1, the winding drum 1 is integral with its two flanges 2 and 3. Drum 1 is rigid with a hub or core 4 perforated by a circular traversing orifice 5. One of the flanges, for example flange 2, is cut by a non-radial slot 6. This slot 6 permits the introduction of the tape measure the extremity of which 11 has a retaining member 12 serving as an end reinforcement for the tape. This end reinforcement for the tape lodges inside drum 1 and is received in a horizontal recess 7 on drum 1. Advantageously, the periphery of flanges 2 and 3 is toothed as represented at 8.

A coil formed by drum 1 and flanges 2 and 3 is mounted inside a half casing 9 (see FIGURE 3) open at its lower extremity. Casing 9 has on one of its faces a non-radial slot 10 corresponding to slot 6 of flange 2. This slot permits a disassembly of the case and its rewinding without disassembling half casing 9. The latter has on each of its faces two openings 13 permitting the passage of a shaft (not shown) passing through orifice 5 of core 4 and securing the latter on casing 9 by suitable screwing. The teeth 8 of flanges 2 and 3 permits the turning of drum 1 by manual action or by making the teeth 8 turn on a surface while holding casing 9.

To this effect, casing 9 has one or several peripheral openings. These openings are made on the periphery of casing 9 and are made either along the entire length of the casing or only on a part of its width. These openings permit access from the exterior to the striated periphery of one or the two flanges of the drum. Said openings of the casing can comprise any length taken along the peripheral direction.

To avoid that the spring tends, once the stress of rewinding or of unwinding the tape measure has ceased, to provoke a slackening of the spirally wound coils causing them to separate, the inner side 14 of the half casing 9 are provided on the edge 15 of flanges 2 and 3 of the winding drum 1 with braking means 16.

These braking means are light spring blades made of a synthetic material such as a plastic. Said blades 16 are obtained by injection and project.

These spring blades 16 rub either against flanges 2 and 3 of the winding drum 1 if they are integral with the inner side 14 of the half casing 9, or against the inner side 14 of half casing 9 if they are mounted on the edges 15 of flanges 2 and 3, and maintain normally the winding drum 1 in the position of maximum winding with its coils tight and this even after the winding or unwinding action exerted on the tape measure has ceased.

There results a better positioning of the wound tape, a better protection of the coils and a more aesthetic appearance and a greater ease of utilisation of the apparatus. In effect, if the coils are separated, their diameter can exceed that of the flanges of the drum and consequently can interfere with manual rewinding, this rewinding taking place by action on the striated periphery of said drum.

With reference to FIGURE 4, the spring blades 16 are disposed on the edge of flange 2 of drum 1, this flange 2 being the one not having slot 6. The said spring blades 16 rub on the inner lateral side of casing 9 which does not have slot 10.

According to another embodiment shown on FIGURE 5, spring blades 16 are integral with the inner walls of casing 9 and contact flange 2 of drum 1.

FIGURE 6 shows still another embodiment. Spring blades 16 are disposed laterally on flange 2 of drum 1. Spring blades 16 contact the wall of casing 9. Rubbing of blades 16 on the wall of casing 9 which is in this case transparent may cause scratching which will mark the appearance of the casing. To avoid this, a mask 17 is secured by any suitable means on the outer wall of casing 9. Naturally the sides of mask 17 is equal to or greater than the sides of spring blades 16 so as to hide any scratches made by rubbing.

What is claimed is:
1. Portable linear measuring instrument comprising in combination a casing formed of two half-shells, having side and peripheral walls, one of said shells having a non-radial slot, a winding drum rotatably mounted in said casing, said drum having a hub and side flanges, said hub having a horizontal recess on the periphery thereof, one of said flanges having a non-radial slot corresponding to said slot on said one shell and communicating with said horizontal recess, a measuring tape coiled on said drum and having at one end a retaining member fitting in said recess, and braking means intermediate at least one of said flanges and the inside of said casing and bearing against either of these for braking relative movement therebetween and thereby preventing expansion of the outer coils of said measuring tape.

2. Linear measuring instrument according to claim 1, wherein the casing is of transparent plastic and said braking means consist of spring blades disposed laterally on the flange and bearing against said side of the casing, and a masking plate is mounted on the corresponding outer side of said casing to mask any scratch made on said casing by said spring blades.

3. Linear measuring instrument according to claim 1, wherein said braking means consist of spring blades mounted on a side wall of said casing.

4. Linear measuring instrument according to claim 1, wherein said braking means consist of spring blades disposed laterally on one of said flanges.

5. Linear measuring instrument according to claim 1, wherein said braking means consist of spring blades disposed on said peripheral wall of one of said half-shells.

6. Linear measuring instrument according to claim 1, wherein the periphery of said flanges is serrated.

References Cited

UNITED STATES PATENTS

| 233,358 | 10/1880 | Leistner et al. | 242—84.8 |
| 2,110,210 | 3/1938 | Evans | 242—84.8 X |
| 2,131,694 | 9/1938 | Stowell | 242—84.8 X |
| 3,078,058 | 2/1963 | Roe | 242—84.8 |

FOREIGN PATENTS

| 686,042 | 1/1953 | Great Britain. |

NATHAN L. MINTZ, *Primary Examiner.*